(12) United States Patent
Ogawa

(10) Patent No.: US 6,407,337 B1
(45) Date of Patent: Jun. 18, 2002

(54) WIRE DISTRIBUTION MEMBER AND WIRE DISTRIBUTION CONFIGURATION

(75) Inventor: Shinji Ogawa, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/412,317

(22) Filed: Oct. 5, 1999

(30) Foreign Application Priority Data

Oct. 29, 1998 (JP) ............................................ 10-307970

(51) Int. Cl.[7] ................................................. H01B 3/00
(52) U.S. Cl. ....................... 174/72 A; 174/154; 174/157
(58) Field of Search ............................. 174/72 A, 88 R, 174/94 R, 128.1, 154, 157

(56) References Cited

U.S. PATENT DOCUMENTS

| | | | | |
|---|---|---|---|---|
| 4,335,269 A | * | 6/1982 | Haskins ........................ | 174/48 |
| 4,820,189 A | * | 4/1989 | Sergeant et al. ............. | 439/395 |
| 5,012,391 A | * | 4/1991 | Schultz, Jr. et al. ......... | 361/428 |
| 5,097,592 A | * | 3/1992 | Schultz, Jr. et al. .......... | 29/832 |
| 6,184,474 B1 | * | 2/2001 | Craft, Jr. .................... | 174/135 |

FOREIGN PATENT DOCUMENTS

JP          9-231814          9/1997

* cited by examiner

Primary Examiner—Dean A. Reichard
Assistant Examiner—W. David Walkenhorst
(74) Attorney, Agent, or Firm—Banner & Witcoff, Ltd.

(57) ABSTRACT

A wire distribution member 40 consists of a plurality of electrical conductors 41 and wrapping members 42. The electrical conductors 41 comprise wires having a degree of rigidity whereby they maintain their own shape independently, and are bent along a prescribed wire distribution path which passes along electrical components including terminal fittings 24 and 26, switches 30 and 31, bulbs 50, and a connector member 16, etc. The wrapping members 42 are sheet-like and leave portions which join with the electrical components uncovered. These wrapping members 42 are joined together so as to maintain the electrical conductors 41 along the prescribed wire distribution path. As a result, each electrical conductor 41 does not need to be attached to the body 11 separately. Further, the electrical conductors 41 have a degree of rigidity whereby they maintain their own shape independently and, consequently, the position of all of the electrical conductors 41 can be fixed by joining the wrapping members 42 and a portion of the electrical conductors 41 to the body 11.

12 Claims, 8 Drawing Sheets

WIRE DISTRIBUTION MEMBER AND WIRE DISTRIBUTION CONFIGURATION

TECHNICAL FIELD

The present invention relates to a distribution member for electrical wires.

BACKGROUND TO THE INVENTION

A wire distribution configuration of a combination lamp of an automobile is described in JP-9-231814. A plurality of bulbs are provided in prescribed locations of a body, and a connector member is provided which supplies electricity to the bulbs.

A wire distribution circuit is provided which passes along a prescribed path to each bulb and the connector member. The wire distribution circuit consists of an electric wire which connects terminal fittings connected to the bulbs, and an electric wire which connects bulb terminal fittings and connector member terminal fittings. These electric wires are distributed along the body, the terminal fittings being attached to both ends of these electric wires.

When wire distribution is carried out in a device having a plurality of bulbs, as in the case described above, a plurality of electric wires are involved. However, the wire distribution path between each bulb and the wire distribution path between the bulbs and the connector members do not have a fixed length, and therefore the electric wires distributed along these wire distribution paths have differing lengths. As a result, the management and handling of the electric wires becomes problematic. Moreover, the electric wires are attached to the body one at a time, and therefore operability is poor. In addition, the electric wires tend to bend easily and, consequently, may rise up above the body and catch on the fingers of the operator or interfere with the distribution or connections of other electric wires. In this case, a clip or the like is required to maintain the position of the electric wires in the prescribed wire distribution path. As a result, the configuration of thee body becomes more complicated, the number of components increases, and the number of operations increases.

SUMMARY OF THE INVENTION

According to the invention there is provided a wire distribution member comprising a plurality of substantially rigid and individual electrical wires arranged in a predetermined pattern, and a connecting member holding said wires in said pattern whereby exposed portions of said wires are adapted for connection to a fixed array of electrical components.

Preferably the connecting member comprises a sheet having apertures or recesses in which said wires are revealed. The wires are preferably bare and the connecting member of insulating material.

In a preferred embodiment, the wires are sandwiched between adjacent sheets. The wires preferably do not make electrical contact.

The connecting member may include positioning means such as one or more apertures to locate the wire distribution member with respect to a substrate such as a fixed array of electrical components. The wires may locate the distribution member.

The connecting member may further include fixing means to fix the distribution member with respect to a substrate. These fixing means are preferably also positioning means and may comprise an aperture of the connecting member for co-operation with a screw or upstanding projection. Alternatively one or more wires may be fixed to a substrate by e.g. bending in or around an abutment of the substrate.

BRIEF DESCRIPTION OF DRAWINGS

Other features of the invention will be apparent from the following preferred embodiment shown by way of example only in the accompanying drawings in which.

DESCRIPTION OF PREFERRED EMBODIMENT

Figure 1:
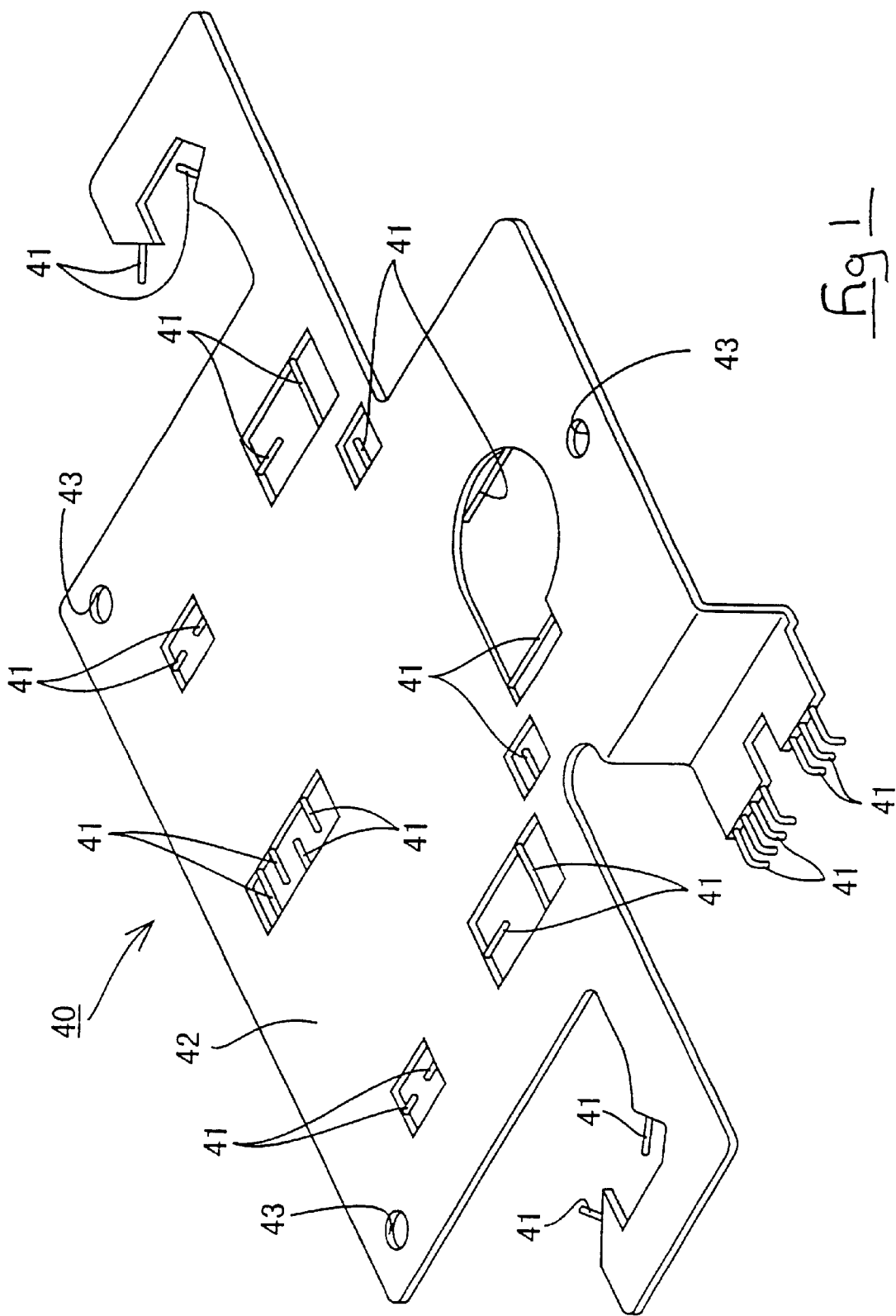
FIG. 1 is a diagonal view of a wire distribution member of an embodiment according to the invention.
Figure 2:
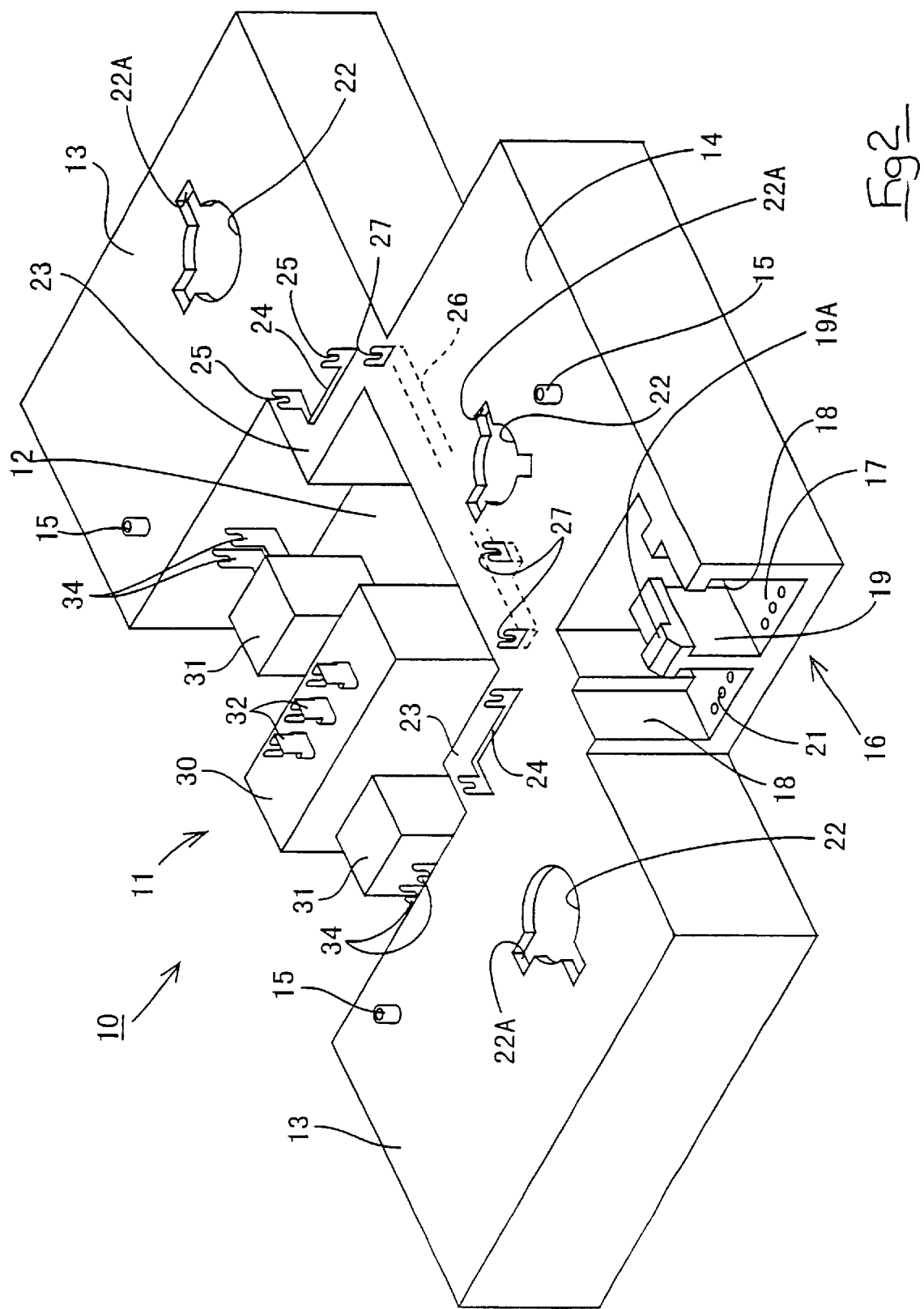
FIG. 2 is a diagonal view of a combination lamp.
Figure 3:
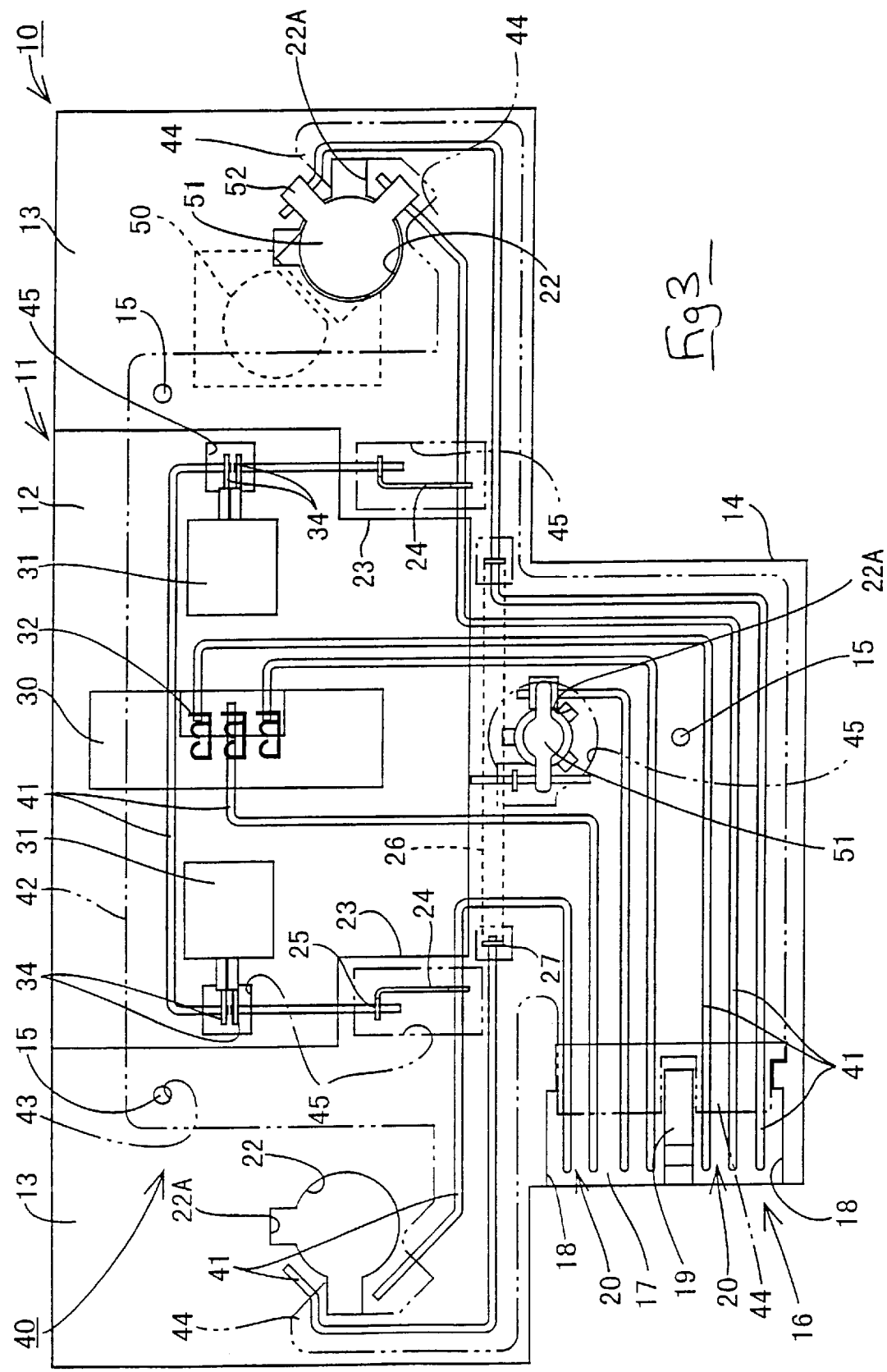
FIG. 3 is a plan view of the wire distribution member attached to the combination lamp.
Figure 4:
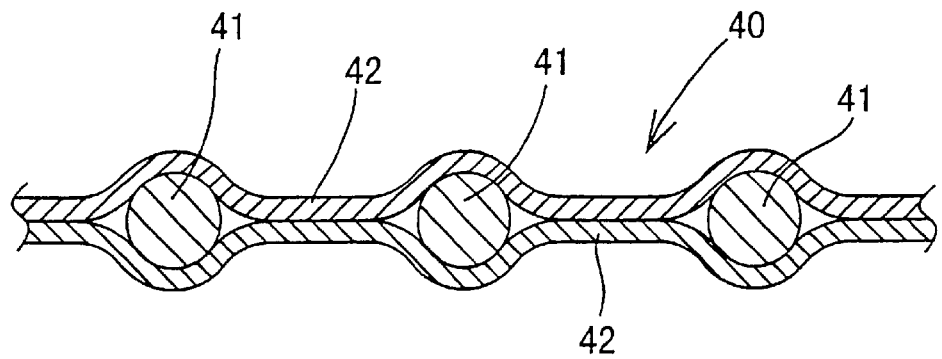
FIG. 4 is a partially enlarged cross-sectional view of the wire distribution member.
Figure 5:
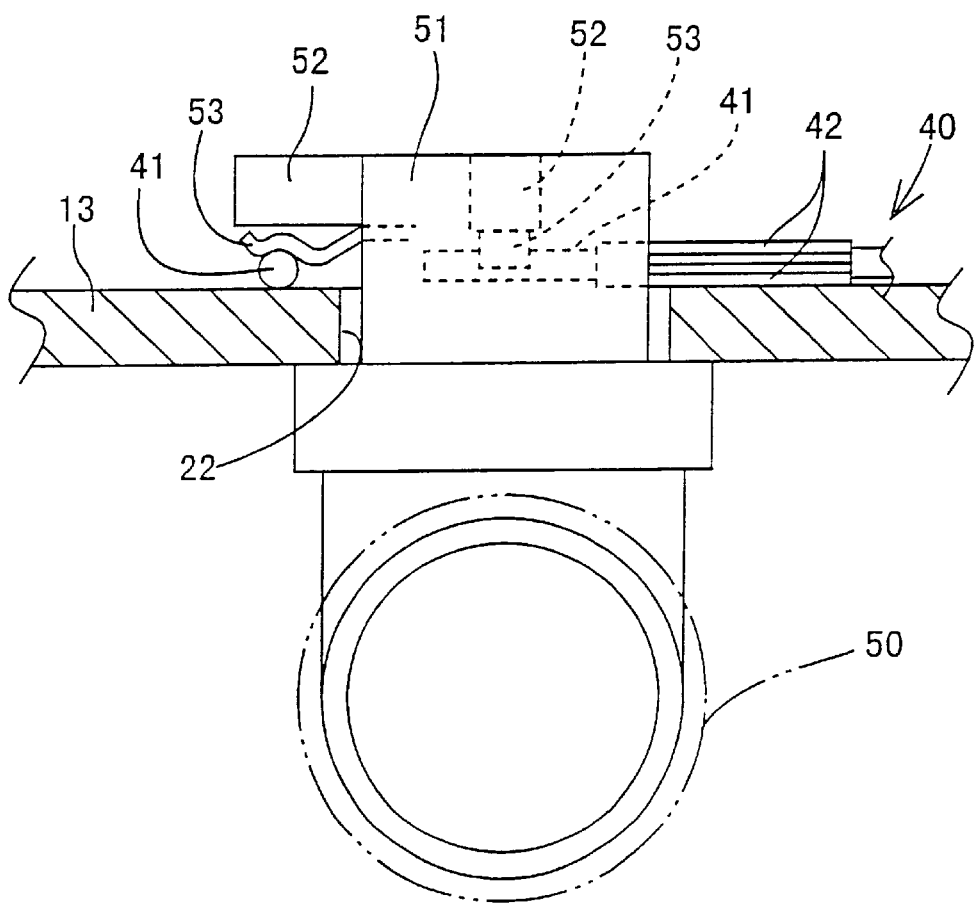
FIG. 5 is a partially enlarged cross-sectional view showing an attachment configuration with a bulb.
Figure 6:
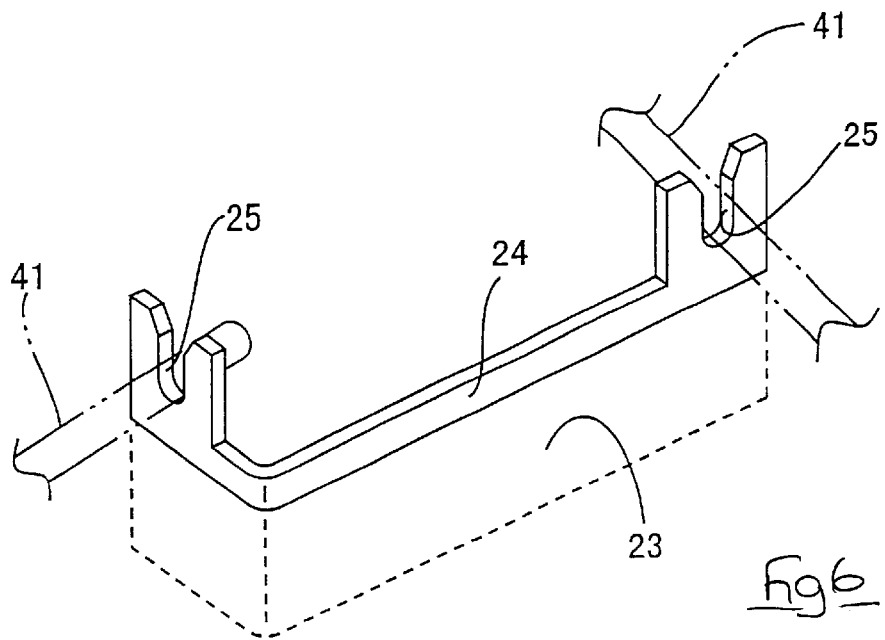
FIG. 6 is a partially enlarged diagonal view showing an attachment configuration with a terminal fitting.
Figure 7:
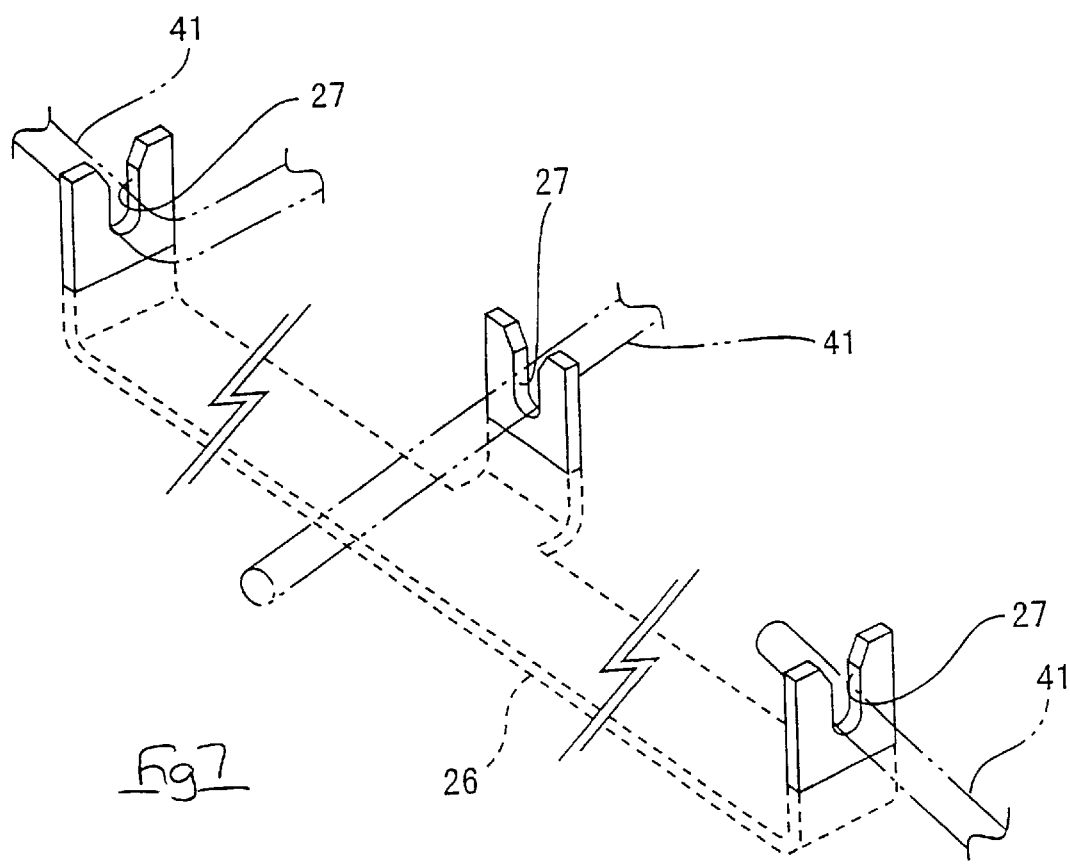
FIG. 7 is a partially enlarged diagonal view showing the attachment configuration with the terminal fitting.
Figure 8:
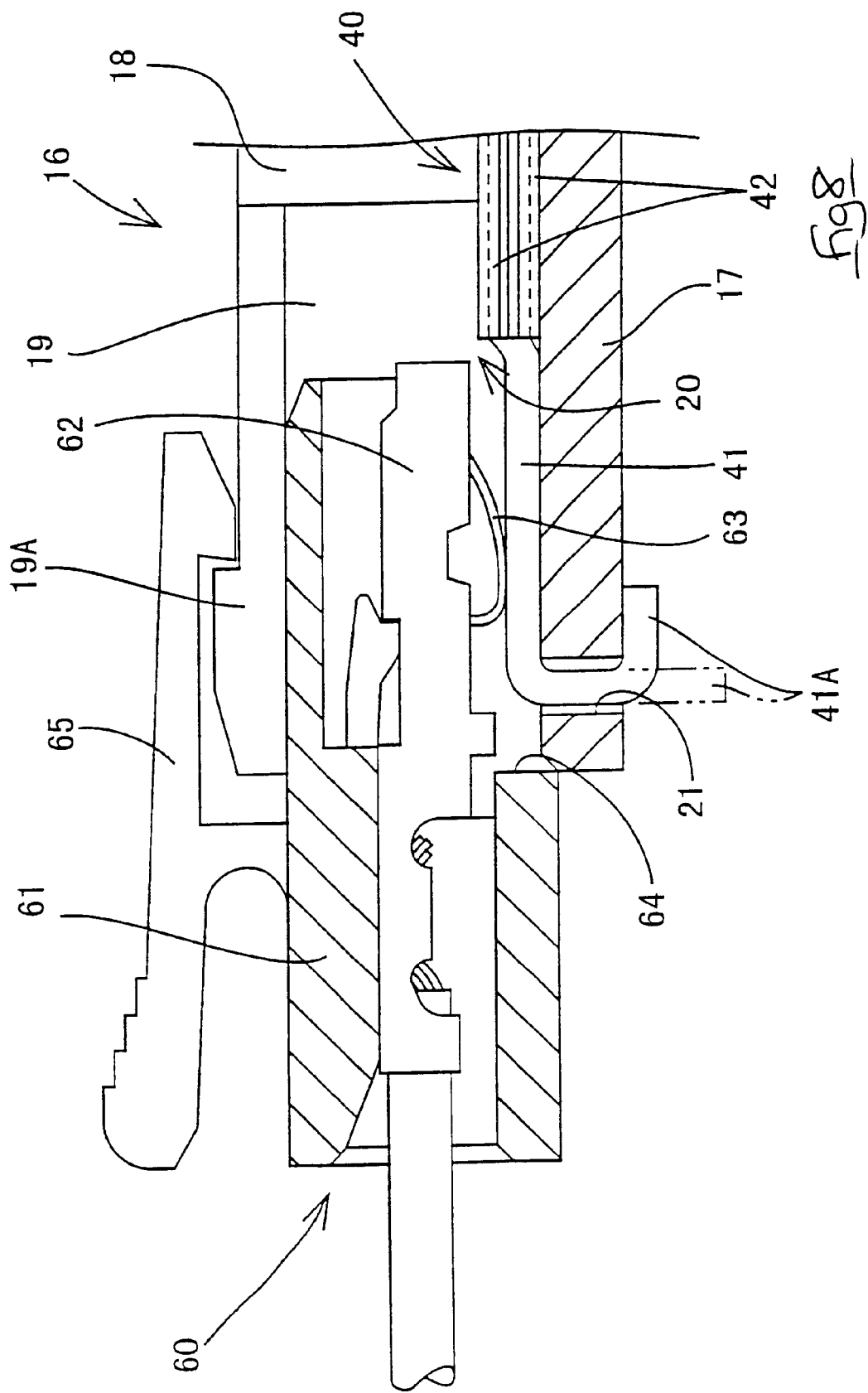
FIG. 8 is a partially enlarged cross-sectional view showing an attachment configuration of a connector member.
Figure 9:
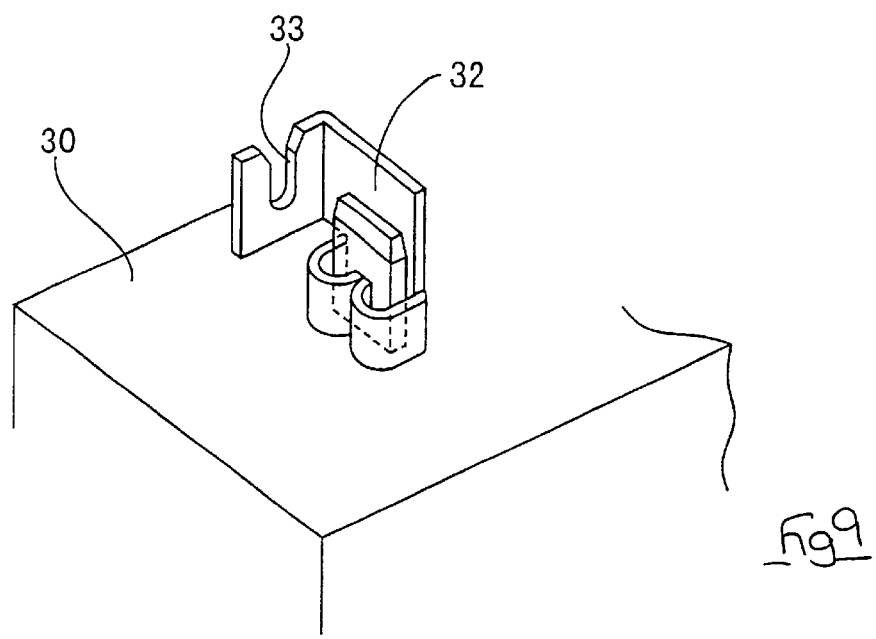
FIG. 9 is a partially enlarged diagonal view showing an attachment configuration with a switch.
Figure 10:
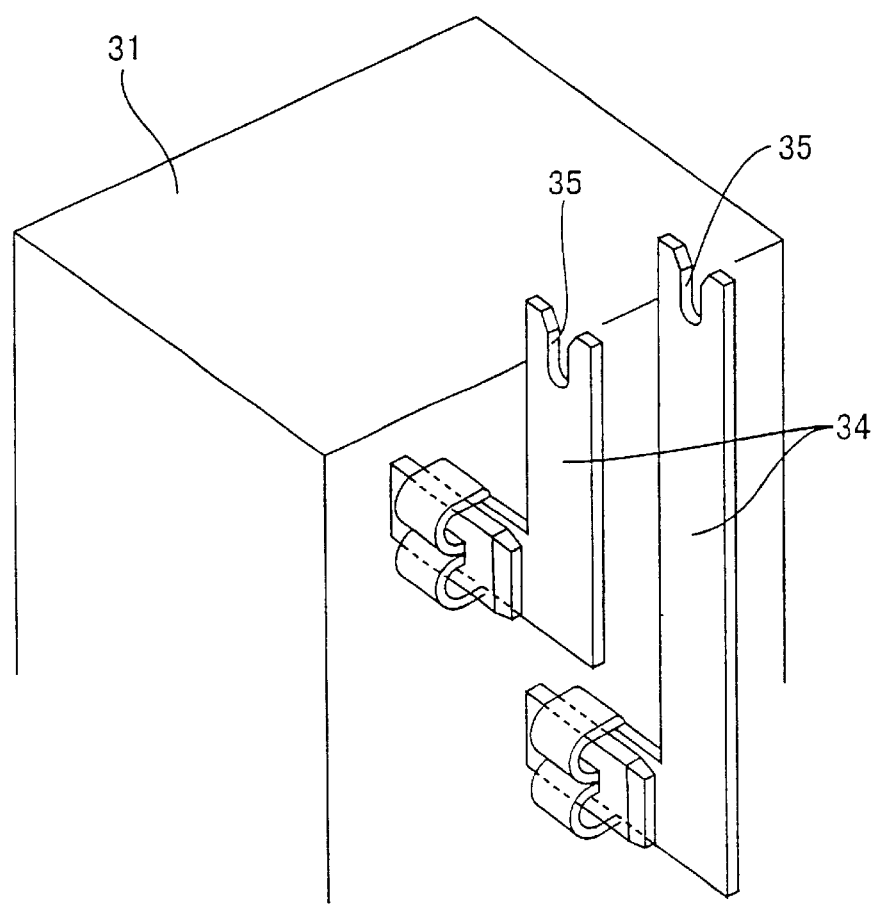
FIG. 10 is a partially enlarged diagonal view showing the attachment configuration with the switch.
Figure 11:
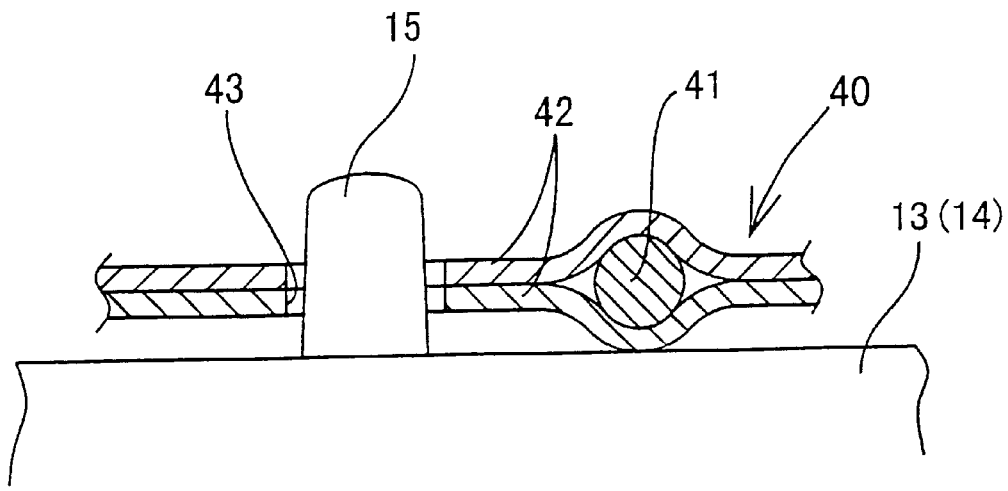
FIG. 11 is a partially enlarged cross-sectional view showing wrapping members in a position-fixing state with a body.

An embodiment of the present invention is explained below with the aid of FIGS. 1 to 9.

The present embodiment is suitable for a combination lamp 10 provided in a cabin roof of an automobile. The combination lamp 10 comprises a plastic body 11, a plurality of bulbs 50 attached to the body 11, a plurality of switches 30 and 31 fixed to the body 11, and a connector member 16 formed in the body 11. Located to the left, right and posterior sides of supporting plate members 12 of the body 11 are three covers 13 and 14, lower faces of which are open. These covers 13 and 14 protrude in a square shape above the supporting plate members 12, the bulbs 50 being covered by these. Attachment holes 22 for attaching the bulbs 50 pass through upper faces of the covers 13 and 14. Moreover, the upper faces of the covers 13 and 14 are all of the same height, and a wire distribution member 40 in a distributed state is attached onto it. Protrusions 15 are formed on the upper faces of the covers 13 and 14 for fixing the position of the wire distribution member 40. In the explanations of the present embodiment, the directions anterior, posterior, left, and right are used relative to FIG. 3.

The connector member 16 is formed on side faces of one of the covers 13 and the cover 14. The connector member 16 comprises: a receiving plate member 17 having the same height as the supporting plate member 12; supporting wall faces 18 which protrude upwards from the posterior and anterior sides of the receiving plate member 17; and a dividing wall 19 which protrudes upwards at a central position relative to the anterior-posterior direction of the receiving plate member 17. Anterior and posterior fitting spaces 20 are formed between the supporting wall faces 18 and the dividing wall 19, side faces and upper faces of these spaces 20 being open. Corresponding connectors 60 of a wire harness attached to a battery (not shown) are fitted in these spaces 20. Position fixing holes 21 pass through the receiving plate member 17 between upper and lower faces thereof, and electrical conductors 41 fit therein.

The corresponding connector 60 comprises a housing 61 which fits in the spaces 20, and a plurality (seven in the present embodiment) of feeder terminal fittings 62 inserted into the housing 61. A cut-away 64 is formed on a lower face of the housing 61, this cut-away 64 allowing a resilient contact member 63 formed on a lower face of a feeder terminal fitting 62 to protrude towards the receiving plate member 17. As will be explained later, the electrical conductors 41 are clamped between the resilient contact member 63 and the receiving plate member 17. Furthermore, a locking arm 65 is formed on an upper face of the housing 61. This locking arm 65 fits with a locking protrusion 19A formed on an upper edge of the dividing wall 19 and thereby latches the corresponding connector 60 and the fitting members 20 in a fitted state.

Three switches 30 and 31 aligned from left to right are fixed to an upper face of the supporting plate member 12. Lower faces of these switches 30 and 31 (the faces close to the interior of the automobile) have slide-type or push-type operating members (not shown). Operating these operating members switches on a light inside the automobile or turns on a map lamp. Three terminal fittings 32 are provided on an upper face of the central switch 30, and a pressure contact slit 33 provided in each terminal fitting 32 allows the electrical conductor 41 to be inserted therein from above. Further, the switches 31 positioned to the left and right each have two terminal fittings 34 provided on a side face, a pressure contact slit 35 being provided in each terminal fitting 34 to allow the electrical conductor 41 to be inserted from above.

The left and right covers 13 and the posterior cover 14 are linked by linking members 23, these linking members 23 being positioned at left and right ends of an anterior edge of the posterior cover 14 and having the same height as the upper face thereof. Upper faces of these linking members 23 are provided with terminal fittings 24 which are L-shaped when viewed from above, both edges of each terminal fitting 24 having pressure contact slits 25 which allow the electrical conductor 41 to be inserted therein from above (see FIG. 6). Long and thin terminal fittings 26 are provided at three locations, the left and right edges and the centre, of the anterior edge portion of the posterior cover 14, these terminal fittings 26 being sunk into the upper face of the cover 14 with portions thereof protruding. The protruding portions of the terminal fittings 26 have pressure contact slits 27 which allow the electrical conductor 41 to be inserted therein from above.

Next the wire distribution member 40 which is attached to the combination lamp 10 will be explained. The wire distribution member 40 comprises the plurality of electrical conductors 41 and two sheet-like wrapping members 42, also referred to herein as conducting members. The electrical conductors 41 consist of electrically conductive single wires which have a relatively wide diameter and therefore a degree of rigidity whereby they cannot readily bend (a degree of rigidity whereby they maintain their own shape independently). The outer circumference of each electrical conductor 41 is not provided with an insulating covering, and is in a state in which electrically conducting faces are exposed. The electrical conductors 41 are attachment holes 22 of the bulbs 50, and connect the terminal fittings 32 and 34 of the switches 30 and 31 and the independent terminal fittings 24 and 26. The electrical conductors 41 bent along this prescribed path are distributed above one of the wrapping members 42, and the other wrapping member 42 is provided on top so that the electrical conductors 41 are covered in a state whereby they are clamped tightly between the two wrapping members 42. The electrical conductors 41 and the wrapping members 42 are fixed by being bonded mutually together by an adhesive agent and are also fixed by welding. The wrapping members 42 are translucent (this includes both transparency or semi-transparency), and therefore it is possible to visually verify the wire distribution path of the electrical conductors 41 which have been clamped. Moreover, the wrapping members 42 are composed of insulating material, and consequently this prevents the short-circuiting of the electrical conductors 41 within the area of their having been clamped by the wrapping members 42.

These wrapping members 42 of the wire distribution member 40, although covering the wire distribution area of the electrical conductors 41, are as small as possible. Furthermore, three fixing holes 43 are formed on the wrapping members 42 at positions which correspond to the protrusions 15 of the covers 13 and 14. In addition, the electrical conductors 41 are exposed from the wrapping members 42 at a position close to the connector member 16, as well as at the attaching positions of the bulbs 50, the attaching positions of the terminal fittings 32 and 34 of the switches 30 and 31, and the attaching positions of the independent terminal fittings 24 and 26. When this exposure is located at the outer edge of the wrapping members 42, a retreating edge 44 allow the ends of the electrical conductors 41 to be exposed. When this exposure is located at the inner portion of the wrapping members 42, cut-away openings 45 open into the wrapping members 42 and the ends or central portions of the electrical conductors 41 become exposed therefrom. Further, at a portion thereof bordering on the connector member 16, the ends of the electrical conductors 41 and a portion of the wrapping members 42 joining therewith are bent, this bend being an L-shape when seen from the posterior. This bent portion extends along inner wall faces of the fitting members 20 and the receiving plate member 17.

Moreover, the anterior end portion of the electrical conductors 41 which extend along the receiving plate member 17 are bent downwards and form position fixing members 41A.

Figure 12:
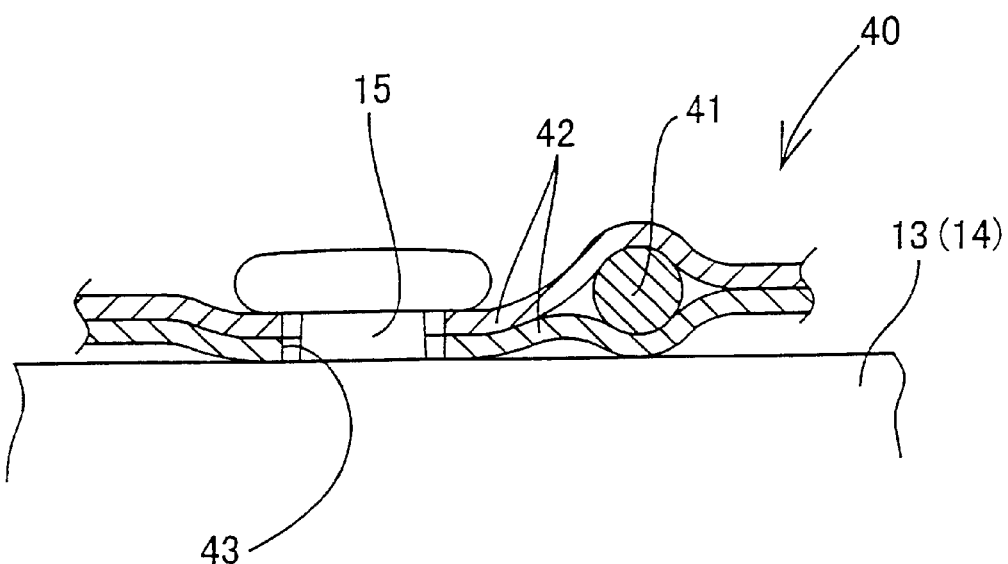
FIG. 12 is a partially enlarged cross-sectional view showing the wrapping members in a state whereby they are fixed to the body.

This wire distribution member 40 is attached to the body 11 from above. When this attachment takes place, the protrusions 15 are fitted with the fixing holes 43 and the wire distribution member 40 is positioned over the covers 13 and 14 and the upper faces of the linking members 23. The portions of the electrical conductors 41 which protrude from the wrapping members 42 are positioned at the upper edges of the pressure contact slits 25, 27, 33 and 35 of the terminal fittings 24, 26, 32 and 34, and the electrical conductors 41 near these pressure contact slits 25, 27, 33 and 35 are driven or pushed therein and fit therewith. As a result, the terminal fittings 24, 26, 32 and 34 and the electrical conductors 41 reach a conducting state. Then, heat is applied to the protrusions 15 which protrude upwards from the wrapping members 42, and the protrusions 15 are squashed to a mushroom head, the circumference edges of these squashed protrusions 15 joining with hole edges of the fixing holes 43 by thermal welding, the wrapping members 42 thereby being fixed to the body 11 and, by extension, the wire distribution member 40 being fixed to the body 11 (see FIG. 12).

Furthermore, portions of the electrical conductors 41 which protrude from the wrapping members 42 are positioned along upper face circumference edges of the attachment holes 22 of the bulbs 50. Consequently, these portions of the electrical conductors 41 come from lower face sides of joining protrusions 52 of bulb holders 51, pass along recesses 22A of the attachment holes 22 and pass through to the upper face side when the bulbs 50 are rotated, the electrical conductors 41 are resiliently clamped between resilient contacting members 53 which are provided at the lower face of the joining protrusions 52 and the upper face circumference edges of the attachment holes 22, and the bulbs 50 and the electrical conductors 41 thereby reach a conducting state (see FIG. 5).

The position fixing members 41A at the anterior ends of the electrical conductors 41 on the connector member 16 fit with the position fixing holes 21, the anterior ends of the position fixing members 41A protruding beyond the lower face of the receiving plate member 17. These protruding position fixing members 41A are bent so as to extend along the lower face of the receiving plate member 17 and thereby regulate their removal from the position fixing holes 21 (see FIG. 8). In this manner, each electrical conductor 41 is fixed to the body 11 in a prescribed position and in a state whereby its position is fixed, and then the feeder terminal fitting 62 of the corresponding connector 60 is attached. That is, the attachment of the wire distribution member 40 to the body 11, as described above, has been completed.

Next, the corresponding connector 60 is fitted to the connector member 16, and the resilient contact member 63 of the feeder terminal fitting 62 makes resilient contact with the electrical conductor 41. This resilient contact is effected by clamping the electrical conductor 41 between the resilient contact member 63 and the receiving plate member 17. The feeder terminal fitting 62 and the electrical conductor 41 thereby reach a conducting state.

In this manner, in the present embodiment, the wire distribution member 40 which comprises the wire distribution path of the combination lamp 10 is configured with a plurality of electrical conductors 41 being clamped in a unified manner between wrapping members 42, all of the electrical conductors 41 can be set simultaneously and, as a result, operability is improved compared to the case in which each electrical conductor 41 is attached to the body 11 one at a time. Accordingly, management and handling are easier.

Further, in addition to the electrical conductors 41 being unified with the wrapping members 42, these electrical conductors 41 have a degree of rigidity whereby they maintain their own shape independently. Consequently, all of the electrical conductors 41 can be fixed in position along the prescribed wire distribution path merely by fixing the wrapping members 42 to three positions on the upper faces of the covers 13 and 14 and by fixing the position of a portion of the electrical conductor 41 relative to the connector member 16. As a result, all of the electrical conductors 41 can be maintained in a distributed state along the prescribed wire distribution path without fixing the position of these electrical conductors 41 individually.

Moreover, the wrapping members 42 are translucent and, consequently, the operator can visually verify the wire distribution path of the electrical conductors 41 at the time when the wire distribution operation within the body 11 is being performed. Fixing the direction and position of the wire distribution member 40 relative to the body 11 is thereby simplified and operability is improved.

Furthermore, the electrical conductors 41 are bare wires, the outer circumferences of which are in an exposed and conducting state. However these electrical conductors 41 are distributed in a manner whereby they do not make mutual contact, and the wrapping members 42 are electrically insulated. As a result, short-circuiting of the electrical conductors 41 is avoided. The electrical conductors 41 do not require an insulating covering, and the issues arising from having a covering, that is, an increase in the diameter of the electrical conductors 41 (an increase in the thickness of the wire distribution member 40) and an increase in cost, are avoided.

Furthermore, the position fixing members 41A of the electrical conductors 41 in the connector member 16 are inserted into the position fixing holes 21 and thereby maintain the electrical conductors 41 in a fixed position on the upper face of the receiving plate member 17, and the electrical conductors 41 make direct contact with the feeder terminal fittings 62. As a result, the connector member 16 does not require terminal fittings to connect with the feeder terminal fittings 62 and, accordingly, the configuration is simplified and the number of components reduced.

The present invention is not limited to the embodiments described above with the aid of figures. For example, the possibilities described below also lie within the technical range of the present invention. In addition, the present invention may be embodied in various other ways without deviating from the scope of the appended claims.

(1) In the above embodiment, the wire distribution member comprises two wrapping members which clamp a plurality of electrical conductors and are unified therewith. However, according to the present invention, a configuration is equally possible whereby the electrical conductors are distributed on one wrapping member and each electrical conductor is fixed separately to that wrapping member by a sheet-like member, or a configuration is possible whereby only sheet-like connecting means connect portions of the electrical conductors and are then unified therewith.

(2) In the above embodiment, the wrapping members are translucent. However, according to the present invention, it is equally possible that the wrapping members are semi-transparent or opaque.

(3) In the above embodiment, the electrical conductors are not provided with a covering and the wrapping members have an insulating function. However, according to the present invention, it is equally possible that the electrical conductors are provided with a covering and that this covering is also covered by the wrapping members.

(4) In the above embodiment, the electrical conductors are distributed on the upper face of the wrapping member in a manner whereby they do not intersect. However, according to the present invention, it is equally possible that they are distributed in a manner whereby they do intersect. In this case, the intersecting portions are insulated for example by an insulating covering for the individual wires.

(5) In the above embodiment, the electrical conductors are bare wires which are entirely covered by the wrapping member. However, a configuration is equally possible whereby the electrical conductors are bare wires and portions thereof are connected by sheet-like connecting means. In this case, a covering may be provided which covers the entire wire distribution member and is attached to the body.

In the above embodiment, the position fixing means utilises holes and ends of the electrical conductors are bent and inserted therein. However, according to the present invention, it is equally possible that the electrical conductors are inserted into the holes without being bent, and that the electrical conductors are maintained in position by applying heat and thereby changing the shape of protrusions formed on the connector member.

What is claimed is:

1. A wire distribution member comprising a plurality of substantial rigid and individual electrical wires that tend to maintain their shape and are not readily bent, wherein the electrical wires are arranged in a predetermined pattern, a connecting member comprising a sheet holding said wires in said pattern and an additional sheet, the wires being sandwiched between the sheet and the additional sheet, the sheets having apertures or recesses in which said wires are revealed, whereby exposed portions of said wires are adapted for connection to a fixed array of electrical components.

2. A wire distribution member according to claim 1 wherein said wires are bare and said connecting member is of electrically insulating material.

3. A wire distribution member according to claim 1 wherein said wires are electrically isolated from each other.

4. The wire distribution member according to claim 1, wherein the sheet is formed of a translucent material.

5. A wire distribution member comprising a plurality of substantially rigid and individual electrical wires that tend to maintain their shape and are not readily bent, wherein the electrical wires are arranged in a predetermined pattern, and a connecting member holding said wires in said pattern whereby exposed portions of said wires are adapted for connection to a fixed array of electrical components, wherein said connecting member includes positioning means whereby said wire distribution member is adapted for positioning with respect to a fixed array of electrical components, and the connecting member comprises a pair of sheets, the wires being sandwiched between the sheets.

6. A wire distribution member according to claim 5 wherein said positioning means comprises one or more apertures.

7. A wire distribution member according to claim 5 wherein said positioning means comprises portions of said wires.

8. A wire distribution member according to claim 7 wherein said positioning means comprises exposed ends of said wires.

9. A wire distribution member according to claim 8 wherein said exposed ends are adapted for electrical connection to an electrical component.

10. A wire distribution member in accordance with claim 5 wherein said positioning means further comprises fixing means for fixing said wire distribution member with respect to a fixed array of electrical components.

11. The wire distribution member according to claim 10, wherein the fixing means comprises an aperture formed in the connecting member.

12. The wire distribution member according to claim 5, wherein the connecting member is formed of a translucent material.

* * * * *